Jan. 26, 1971  R. G. RAKES  3,559,014

SINGLE SENSOR BRUSHLESS D.C. MOTOR

Filed Aug. 13, 1969

INVENTOR
RODNEY G. RAKES
BY
Joseph M. Roehl
ATTORNEY

United States Patent Office 3,559,014
Patented Jan. 26, 1971

3,559,014
SINGLE SENSOR BRUSHLESS D.C. MOTOR
Rodney G. Rakes, Charlottesville, Va., assignor to Sperry Rand Corporation, a corporation of Delaware
Filed Aug. 13, 1969, Ser. No. 849,850
Int. Cl. H02k *21/08;* H02p *1/18*
U.S. Cl. 318—138                                    8 Claims

ABSTRACT OF THE DISCLOSURE

A brushless D.C. motor contains a pair of diametrically opposed stator windings and a permanent magnet rotor rotatable therebetween. A shutter mounted on the rotor shaft, interrupts the passage of light between a source and the sensor during alternate half cycles of the rotor revolution. A steering circuit directs current flow to one stator winding when the sensor is illuminated and to the other stator winding when the sensor is dark. Amplifying means in the steering circuit are electrically energized through the light source.

BACKGROUND OF THE INVENTION (1) Field of the invention

This invention relates to brushless D.C. motors and more specifically to single sensor, light actuated brushless D.C. motors.

(2) Description of the prior art

Light actuated brushless D.C. motors are well known in the prior art. In general, these motors include a light source which is modulated in synchronism with the rotor rotation. This modulated light is used as a signal for selectively energizing stator coils through a steering circuit.

Ordinarily, a relatively low voltage is required to energize the light source. In some prior art devices, separate voltage supplies are required for this. In others, the light source is placed in series with a dropping resistor. In critical application, however, such means are wasteful of energy and contribute to the weight and bulk of the motor. This is especially troublesome in motors designed for low power application where high efficiency is vital.

Motors of this type have been developed in which the light source is connected in series with the motor itself. This improves the efficiency of the system. However, in these motors the switching circuits used to energize the stator coils cannot be clamped to ground potential. For low power applications, these circuits preferably employ solid state elements, so that high operating temperatures may impair the stability of the switching circuits and thus interfere with the commutation cycle.

SUMMARY OF THE INVENTION

Brushless D.C. motors constructed according to the present invention utilize a source of radiant energy connected in series with amplifying means in the switching circuit of the motor so as to improve the efficiency of the motor without a corresponding sacrifice in stability.

DESCRIPTION OF THE PREFERRED EMBODIMENT

Figure 1:
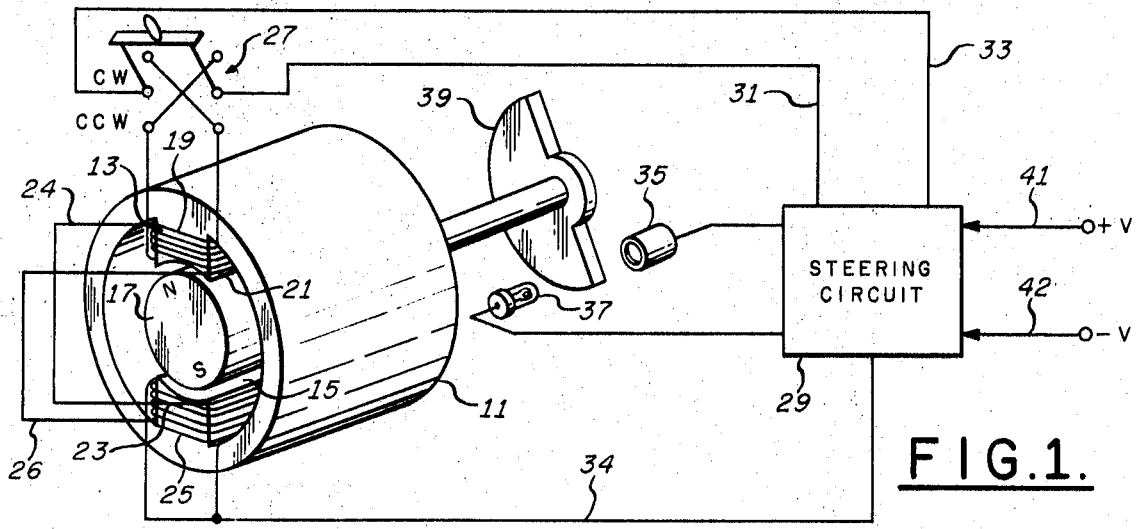
FIG. 1 is a drawing partly in persepective showing a motor employing the present invention.

Referring now to FIG. 1, a reversible brushless D.C. motor includes a stator 11 which includes a pair of stator poles 13 and 15 disposed diametrically opposite each other. A permanently magnetized rotor 17 is positioned between the stator poles so as to be rotatable in response to magnetic fields established in the stator poles. Each stator pole carries two oppositely-wound coils. Thus the stator pole 13 is wound with the coils 19 and 21 whereas the pole 15 is wound with the coils 23 and 25. The coils 19 and 23 are connected in series through a lead 24 whereas the coils 21 and 25 are connected in series through a lead 26. The coils 13 and 19 are connected through a reversing switch 27 to a steering circuit 29. The steering circuit, which will be explained in detail, supplies a unipolar voltage alternately to the lines 31 and 33.

The series connected coils 19 and 23 cooperate to form a first stator winding that establishes a magnetic field across the rotor in a first direction when these coils are energized. The series connected coils 21 and 25 similarly cooperate to form a second stator winding that establishes a magnetic field across the rotor in the opposite direction when these coils are energized. Current from the stator windings is returned to the steering circuit 29 through the common line 34.

The steering circuit 29 provides stator winding energizing voltages alternately to the lines 31 and 33 in response to signals from an optical sensor 35. The sensor is responsive to light energy from a source 37. The energy from the source 37 is modulated by a modulating means 39 as the rotor rotates.

In its presently preferred embodiment, the source 37 may be any conventional light source such as an incandescent lamp or a solid state electroluminescent diode such as a gallium arsenide source. The sensor might be any conventional photosensitive diode. The modulating means 39 preferably is in the form of a semicircular optical shutter constructed of opaque material which operates to interrupt the light from the source 37 during one-half of a rotor revolution and to permit passage of the light to the sensing means 35 during the alternate half of the rotor revolution.

Assume that the steering circuit 29 is constructed so that the line 31 is energized when the sensor 35 is illuminated and the line 33 is energized when the sensing means 35 is dark. The steering circuit is energized from a pair of busses 41 and 42.

Figure 2:
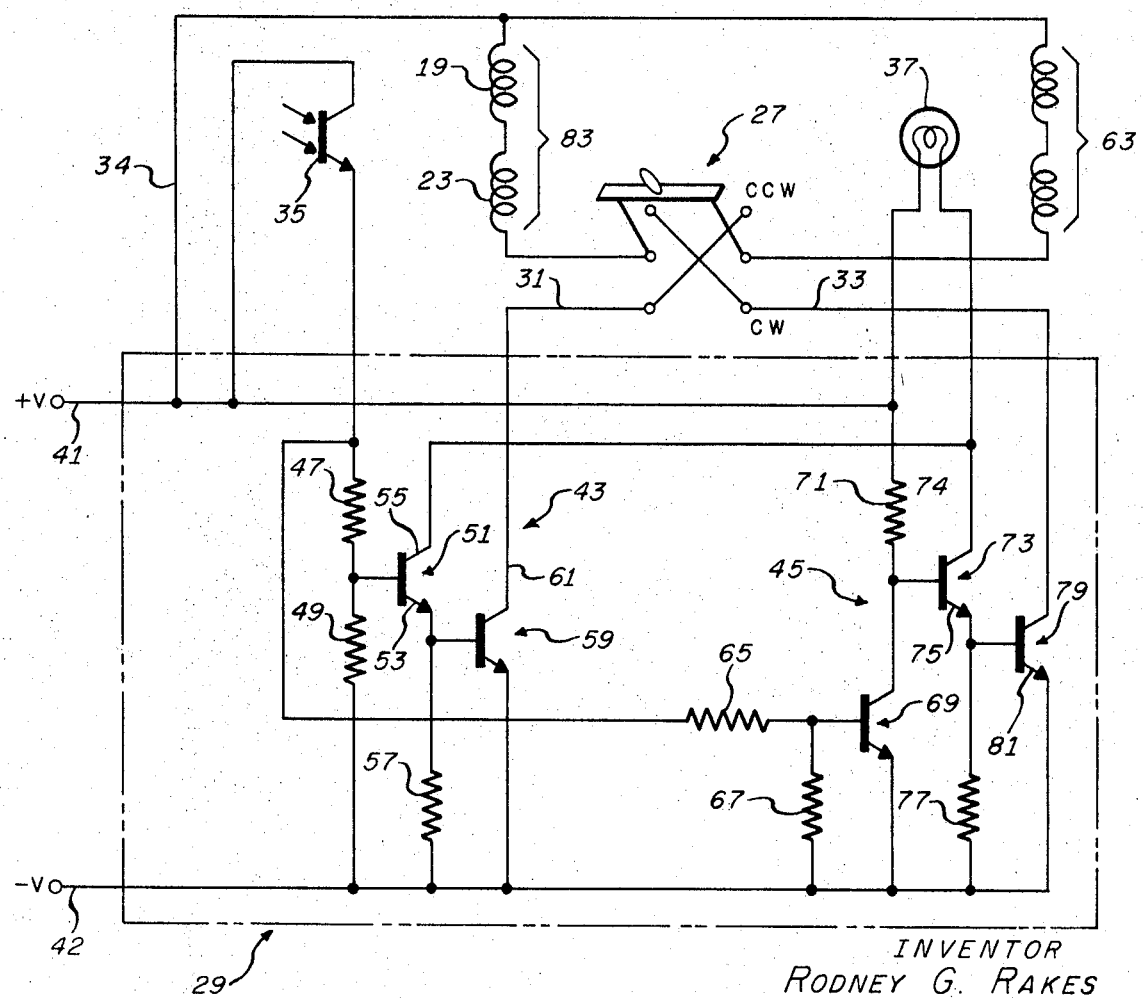
FIG. 2 is a circuit diagram illustrating the principles of the present invention.

Referring now to FIG. 2, the steering circuit 29 constructed according to the principles of the present invention includes a first switching stage 43 and a second switching stage 45. Each stage is energized through the busses 41 and 42. The stage 43 is actuated directly in response to signals received by the sensor 35. The collector of the sensor 35 is connected directly to the positive buss 41. The emitter of the sensor 35 is connected through a pair of resistors 47 and 49 to the negative buss. A command signal at the junction of these resistors is applied to the base electrode of an amplifying transistor 51 in the switching stage 43. The gain of the amplifying stage is sufficient to drive a gating transistor 59 between cut-off and saturation.

The output terminals of this transistor include an emitter 53 and a collector 55. The collector 55 is energized through the light source 37 from the positive buss.

The emitter of the amplifying transistor 51 is connected through an emitter resistor 57 to the negative buss and to the base electrode of a gating transistor 59. The output terminals of the gating transistor include a collector 61 connected through the reversing switch 27 and one of the stator windings to the positive buss, and an emitter electrode connected directly to the negative buss.

The motor winding 63 comprises the coils 21 and 25 and is actuated through this gating transistor when the reversing switch is in the counterclockwise postion.

The voltage at the emitter electrode of the sensing means 35 is also applied to a voltage dividing network including a first resistor 65 and a second resistor 67 connected to the negative buss. The voltage at the junction point of these two resistors is applied to the base electrode of an inverting transistor 69. The emitter electrode of the transistor 69 is connected directly to the negative buss. The collector electrode of the transistor 69 is connected to the positive buss through a collector resistor 71.

The collector voltage of the transistor 69 is applied to the base electrode of an amplifying transistor 73. This voltage constitutes a command signal. However, since this signal is derived from the inverting transistor 69, it will be opposite in phase to the corresponding command signal applied to the amplifying transistor 51 in the switching stage 43.

The output circuit of the amplifying transistor 73 includes a collector electrode 74 connected through the light source 37 of the positive buss. This collector electrode is also connected directly to the corresponding collector electrodes of the transistor 51 in the switching circuit 43.

The output circuit of the transistor 73 also includes an emitter electrode 75 connected through an emitter resistor 77 to the negative buss. The collector voltage is applied to a gating transistor 79. The output circuit of this gating transistor includes an emitter electrode 81 connected directly to the negative buss and a collector electrode connected to the positive buss through the stator winding selected by the reversing switch. For counterclockwise rotation, winding 83 is energized through gating transistor 79. Stator winding 83 includes the individaul coils 19 and 23.

Each of the amplifying transistors is energized through the light source 37. Thus, the voltage drop across these two transistors is sufficient to energize the lamp at its rated voltage. No exterior resistors are needed to supply a suitable lamp voltage. Therefore, power is not wasted in performing this function.

Any convenient type of lamp may be used for the light source 37. Commercial incandescent lamps as well as gallium arsenide light emitting diodes have been used successfully, for instance, in motors employing the principles of the invention. Commercially available transistors or integrated circuits have also been used in the switching stages.

The gating transistors have their emitter electrodes connected directly to the negative buss. Therefore, when one of these transistors is saturated, the corresponding stator winding is effectively connected directly between the busses.

Since the amplifying transistors provide a voltage sufficient to switch the corresponding gating transistors between the cut-off and the saturated condition, temperature changes do not affect the switching characeristics of the gating transistors to any significant degree.

The operation of the present invention may be understood by referring to both FIGS. 1 and 2. Assume that the reversing switch 27 is thrown in a position for providing counterclockwise rotation, and that the rotor is initially in the position indicated in FIG. 1.

Under these conditions, the shutter 39 will block the flow of energy from the lamp 37 so that the sensor 35 will be dark. In the darkened condition, the sensor 35 will produce a low level command signal to the transistor 51 in the switching stage 43. This will drive the gating transistor 59 to cut-off. At the same time, the signal from the sensor 35 will be applied to the inverting transistor 69 which will provide a high level command signal to the amplifying transistor in the switching stage 45 so as to saturate the gating transistor and energize the stator winding 83. This will provide a north magnetic pole at the stator pole 13 and a south magnetic pole at the stator pole 15. The corresponding magnetic poles in the rotor 17 will thus be repelled and the rotor will begin to rotate in the counterclockwise direction as desired.

When the rotor has rotated to a position such that the north magnetic pole in the rotor is aligned with the axis of the stator pole 15, the shutter 39 will have rotated to a position such that it no longer blocks the flow of light from the source 37 to the sensing means 35.

At this time, the sensing means becomes illuminated and provides a command signal to the amplifying transistor in the stage 43 which causes this transistor to conduct so as to saturate the gating transistor 59.

The same output signal from the sensing means 35 passes through the inverting transistor 69 in the switching stage 45 and causes the gating transistor 79 to be driven to cut-off. The stator winding 63 is now energized and the stator winding 83 is de-energized. The magentic field established by the stator windings is now reversed in direction and the rotor will continue its counterclockwise rotation in order to follow this change in the magnetic field.

When the sensor 35 is illuminated, the inverting transistor in the stage 45 is saturated. This effectively clamps the base of the amplifying transistor directly to the negative buss 42. This feature of the circuit provides positive turn-off for the normally conducting stage 45. Because the input circuit of the amplifying transistor is effectively short-circuited under these conditions, temperature sensitivity is minimized.

It will be remembered that the magnetic field of the rotor was assumed to be offset slightly from alignment with the stator poles when power was first applied to the motor. Means for automatically accomplishing such offset are known in the prior art.

Although the source and sensor means have been described as optical devices, it will be appreciated that these elements ned not operate in the visible spectrum. In general, any convenient form of radiant energy may be used if desired. Furthermore, known types of devices employing the Hall effect may also be used where desired. The basic function of the modulating means is to supply high and low level signals through out opposite half cycles of rotor revolution.

A particular reversible motor has been described. It will be appreciated that non-reversible motors may utilize the principles of the invention by simply eliminating the reversing switch. In some non-reversible motors, it may be convenient to simplify the construction by winding the entire coil 63 on one stator pole and the entire coil 83 on the other stator pole. Each winding will then be wound to attract the same magnetic pole of the rotor.

Although the motor illustrated in FIG. 1 contains only one pair of stator poles, it will be obvious to those skilled in the art that the principles of the invention can be applied to known types of motors employing two pairs of stator poles wherein the pairs of poles are energized alternately. In such a configuration, the shutter 39 would be arranged in quadrants so that the sensing means would be alternately irradiated and shielded as the rotor traverses successive quadrants.

While the invention has been described in its preferred embodiment, it is to be understood that the words which have been used are words of description rather than limitation and that changes may be made without departing from the true scope and spirit of the invention in its broader aspects.

What is claimed is:

1. A brushless D.C. motor comprising first and second stator windings, a permanently-magnetized rotor rotatable therebetween, an electrically energizable source of radiant energy, first and second gating means for controlling the flow of current through said first and second stator windings respectively, first and second amplifying means for driving said first and second gating means respectively, both of said amplifying means being electrically energizable through said source of radiant energy, sensing means constructed and arranged to respond to radiant energy from said source, modulating means synchronized with the rotation of said rotor and arranged to interrupt the passage of radiant energy to said sensing means throughout alternate half cycles of the rotor rotation whereby said sensing means produces a high level output signal during one-half of a rotor revolution and a low level output signal during the other half of a rotor revolution, means to apply first and second command signals from said sensing means to said first and second amplifying means, respectively, said first and second command signals having magnitudes directly and inversely related, respectively, to the level of energy being received by said sensing means.

2. The apparatus of claim 1 wherein said modulating means is a semicircular shutter arranged to rotate with said rotor.

3. The apparatus of claim 2 wherein the motor is energized through a pair of power busses and wherein each of said gating means includes a gating transistor connected in series with the stator winding controlled thereby, the series combination of said stator winding and said gating transistor being connected directly across said power busses.

4. The apparatus of claim 3 wherein said source of radiant energy is a light source.

5. The apparatus of claim 4 further characterized in that each of said amplifying means is an amplifying transistor having first and second output terminals, the first of said output terminals of each of said amplifying transistors being connected through said light source to one of said power busses, the second of said amplifying transistor output terminals being indivdually coupled to the other of said power busses and to the gating transistor driven by that amplifying transistor.

6. The apparatus of claim 5 wherein the means to apply a first command signal includes a coupling means for coupling a signal from said sensor directly to one of said amplifying transistors and wherein the means to apply a second command signal includes an inverting means to apply an inverted signal from said sensor to said second amplifying transistor.

7. The apparatus of claim 6 wherein the transistor in said second amplifying means further includes an input terminal, and wherein said inverting means includes an inverting transistor having a first output terminal connected directly to the input terminal of the transistor in said second amplifying means, said inverting transistor further having a second output terminal connected directly to said other power buss.

8. A brushless D.C. motor comprising a cylindrical motor housing, at least one pair of stator coils, said coils being disposed at equiangular intervals around the interior of said motor housing, a rotor having at least one pair of magnetic poles, said rotor being rotatable between said stator coils, an electrically energizable source of radiant energy, first and second gating means for controlling the flow of current through selected pairs of stator windings, first and second amplifying means for driving said first and second gating means respectively, both of said amplifying means being electrically energizable through said source of radiant energy, sensing means constructed and arranged to respond to radiant energy from said source, modulating means synchronized with the rotation of said rotor and arranged to interrupt the passage of radiant energy to said sensing means as the rotor passes throughout alternate equiangular intervals whereby the sensing means produces alternate high and low level output signals as the rotor rotates, and means to apply first and second command signals from said sensing means to said first and second amplifying means, respectively, said first and second command signals having magnitudes directly and inversely related, respectively, to the level of energy being received by said sensing means.

References Cited

UNITED STATES PATENTS 3,412,303 11/1968 Rakes _____ 318—138
3,453,514 7/1969 Rakes et al. _____ 318—138

GLEN R. SIMMONS, Primary Examiner

U.S. Cl. X.R.

318—254